United States Patent
Afdasta et al.

(10) Patent No.: US 11,588,271 B2
(45) Date of Patent: Feb. 21, 2023

(54) MODULAR CONNECTOR FOR RIGID TUBING

(71) Applicant: AFC Cable Systems, Inc., New Bedford, MA (US)

(72) Inventors: Skip N. Afdasta, Coventry, RI (US); Gene Ellis, Taunton, MA (US); Mike Vertente, Fairhaven, MA (US)

(73) Assignee: AFC Cable Systems, Inc., New Bedford, MA (US)

( * ) Notice: Subject to any disclaimer, the term of this patent is extended or adjusted under 35 U.S.C. 154(b) by 306 days.

(21) Appl. No.: 16/907,504

(22) Filed: Jun. 22, 2020

(65) Prior Publication Data

US 2021/0399461 A1 Dec. 23, 2021

(51) Int. Cl.
*F16L 9/02* (2006.01)
*H01R 13/516* (2006.01)
*F16L 9/127* (2006.01)
*H02G 3/06* (2006.01)

(52) U.S. Cl.
CPC ............. *H01R 13/516* (2013.01); *F16L 9/02* (2013.01); *F16L 9/127* (2013.01); *H02G 3/06* (2013.01)

(58) Field of Classification Search
CPC .... H01R 25/162; H01R 33/945; H01R 11/01; H01R 13/74
See application file for complete search history.

(56) References Cited

U.S. PATENT DOCUMENTS

| | | | | |
|---|---|---|---|---|
| 5,315,062 A * | 5/1994 | Hoshino | ............. | H01R 13/506 439/658 |
| 5,490,693 A * | 2/1996 | Fisher | ................... | F16L 19/005 285/420 |
| 5,866,853 A * | 2/1999 | Sheehan | .............. | H02G 3/0675 174/653 |
| 5,894,109 A * | 4/1999 | Marik | ................... | H02G 3/0683 D13/152 |
| 7,078,623 B1 * | 7/2006 | Sheehan | .............. | H02G 3/0616 174/152 G |
| 7,658,418 B1 * | 2/2010 | Elbaz | ....................... | H02G 3/06 285/354 |
| 7,826,202 B2 | 11/2010 | Johnson et al. | | |
| 10,958,051 B1 * | 3/2021 | Howard | .............. | H02G 3/0683 |
| 2011/0137294 A1 * | 6/2011 | Calimeri | ............... | A61M 39/10 604/533 |
| 2012/0032436 A1 * | 2/2012 | Zantout | ................ | H02G 3/0468 285/149.1 |
| 2016/0261098 A1 * | 9/2016 | Grant | ..................... | H02G 3/081 |
| 2017/0030489 A1 * | 2/2017 | DeCesare | ................ | F16L 5/08 |
| 2019/0081430 A1 * | 3/2019 | Saitoh | .................. | H02G 3/0462 |
| 2019/0334332 A1 * | 10/2019 | Yeh | ....................... | H02G 3/0616 |
| 2020/0227899 A1 * | 7/2020 | Yeh | ....................... | H02G 3/0616 |
| 2020/0287366 A1 * | 9/2020 | Vrame | ................. | H02G 1/1202 |
| 2020/0309293 A1 * | 10/2020 | Andrew | .................... | H02G 3/06 |

* cited by examiner

*Primary Examiner* — Truc T Nguyen

(74) *Attorney, Agent, or Firm* — KDB Firm PLLC

(57) ABSTRACT

Modular connectors for rigid tubing are provided. An assembly according to embodiments of the present disclosure may include a rigid tube connected to a coupling assembly, the coupling assembly including a main body having a first tubular section and a second tubular section. The assembly may further include a connector head coupled to the coupling assembly, the connector head including a first section coupled to a second section, wherein the first and second sections define an internal cavity for housing an electrical connector, and wherein the first tubular section extends within the internal cavity.

20 Claims, 10 Drawing Sheets

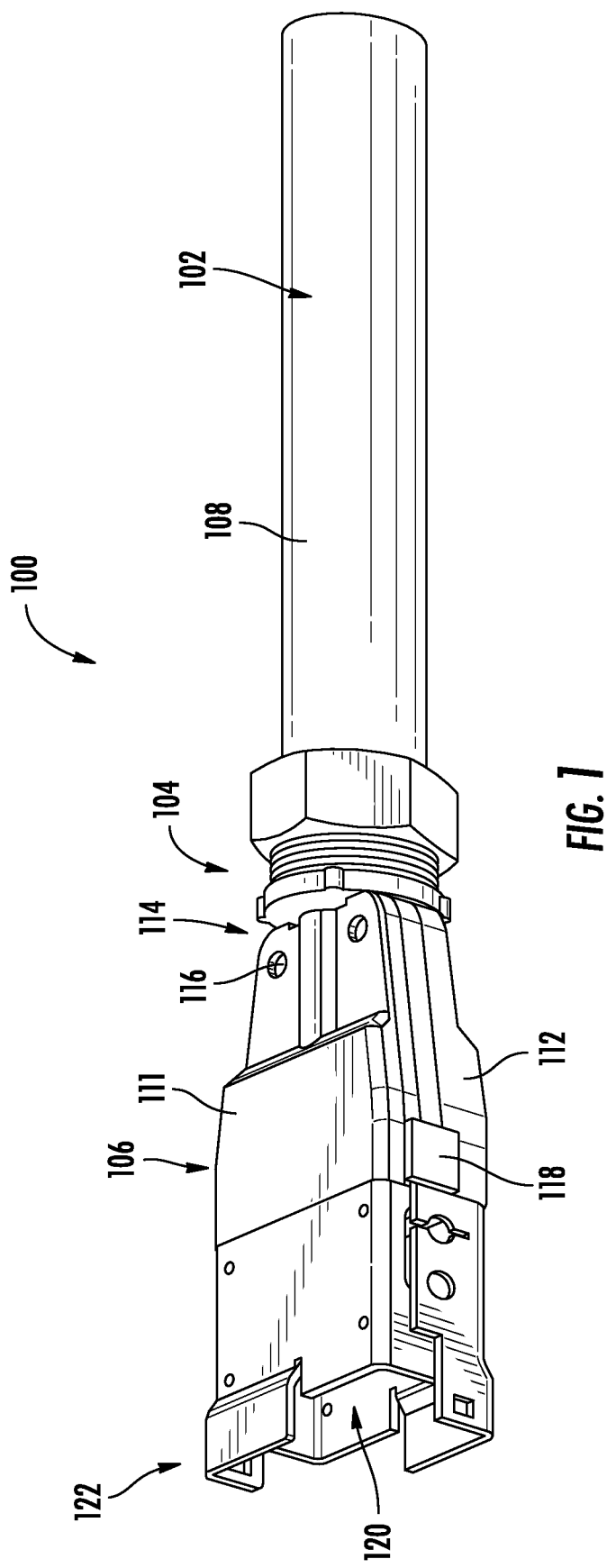

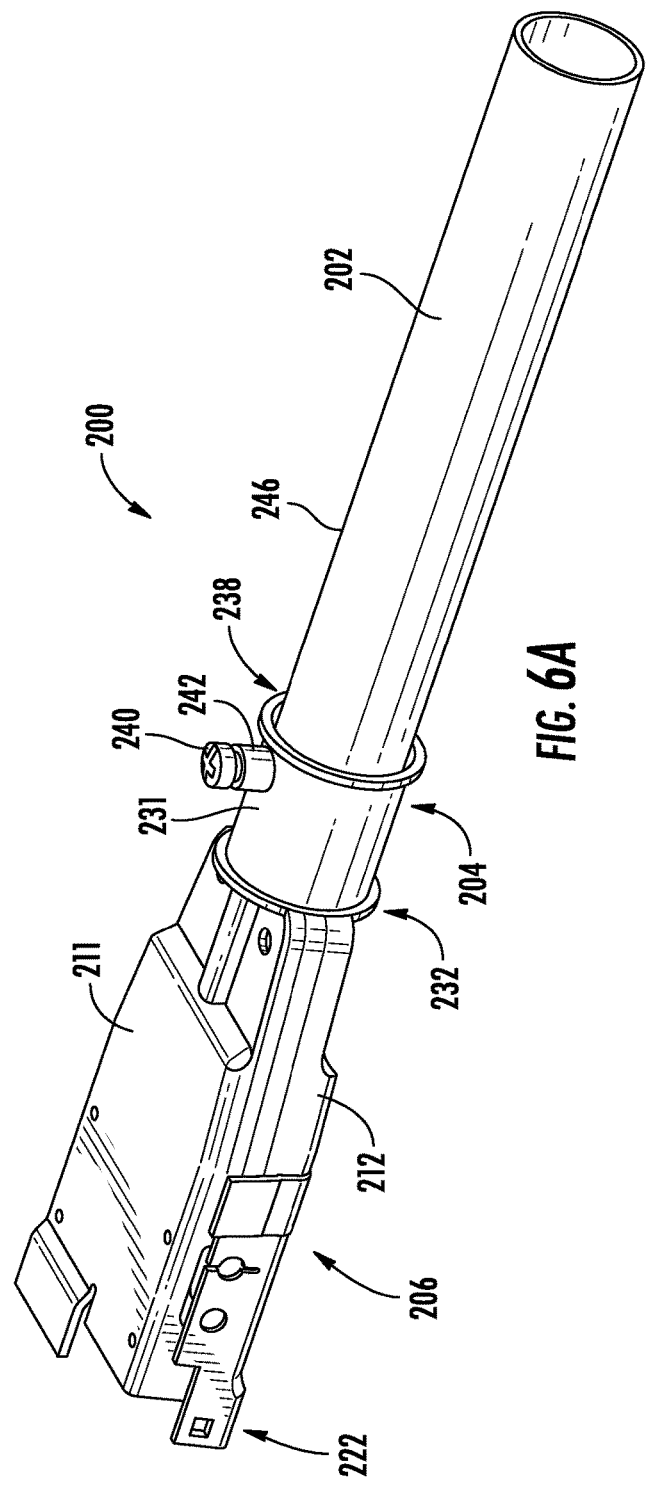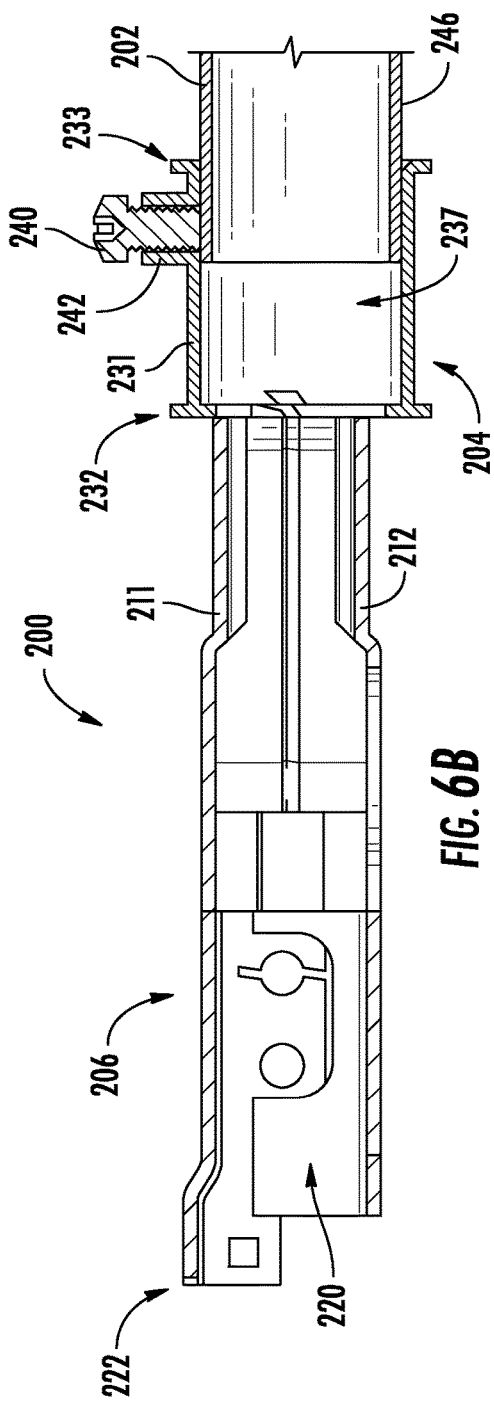

MODULAR CONNECTOR FOR RIGID TUBING

FIELD OF THE DISCLOSURE

The disclosure relates generally to electrical connectors and, more particularly, to a modular connectors for rigid tubing, such as electrical metallic tubing.

BACKGROUND OF THE DISCLOSURE

Today's advanced buildings require innovative and flexible wiring systems. Current designs include modular wiring systems, which may be prefabricated according to customers' electrical and communications plans, and shipped to construction sites ready to install. These manufactured wiring systems may be installed in commercial, industrial, retail and institutional facilities, providing substantial saving in total installed wiring costs and reduced installation time over, e.g., traditional hard-wired approaches. Modular wiring systems often house wiring in a flexible raceway, such as MC cable. However, a need exists to provide modular wiring solutions with a rigid raceway. It is with respect to this and other drawbacks of the prior art that the present disclosure is provided.

SUMMARY

The Summary is provided to introduce a selection of concepts in a simplified form, the concepts further described below in the Detailed Description. The Summary is not intended to identify key features or essential features of the claimed subject matter, nor is the Summary intended as an aid in determining the scope of the claimed subject matter.

An assembly according to embodiments of the present disclosure may include a rigid tube connected to a coupling assembly, the coupling assembly including a main body having a first tubular section and a second tubular section. The assembly may further include a connector head coupled to the coupling assembly, the connector head including a first section coupled to a second section, wherein the first and second sections define an internal cavity for housing an electrical connector, and wherein the first tubular section extends within the internal cavity.

An electrical metallic tubing coupling assembly according to embodiments of the present disclosure may include an electrical metallic tubing connected to a coupling assembly, the coupling assembly including a main body having a first tubular section connected to a second tubular section. The electrical metallic tubing coupling assembly may further include a connector head coupled to the coupling assembly, the connector head including a first section and a second section coupled to the first section, wherein the first and second sections define an internal cavity for housing an electrical connector, and wherein the first tubular section extends within the internal cavity.

A connector head for an electrical metallic tubing according to embodiments of the present disclosure may include a first section; and a second section coupled to the first section, wherein the first and second sections define an internal cavity for housing an electrical connector, wherein the first section includes a first internal planar section, wherein the second section includes a second internal planar section extending perpendicular to the first internal planar section, and wherein at least one of the first internal planar section and the second internal planar section includes a recess for receiving a coupling assembly connected to the electrical metallic tubing.

BRIEF DESCRIPTION OF THE DRAWINGS

The accompanying drawings illustrate exemplary approaches of the disclosed embodiments so far devised for the practical application of the principles thereof.

FIG. 1 is a perspective view of an assembly in accordance with embodiments of the present disclosure.

FIG. 6A is a perspective view of an assembly in accordance with embodiments of the present disclosure.

FIG. 6B is a side cross-sectional view of the assembly of FIG. 6A in accordance with embodiments of the present disclosure.

Figure 2A:
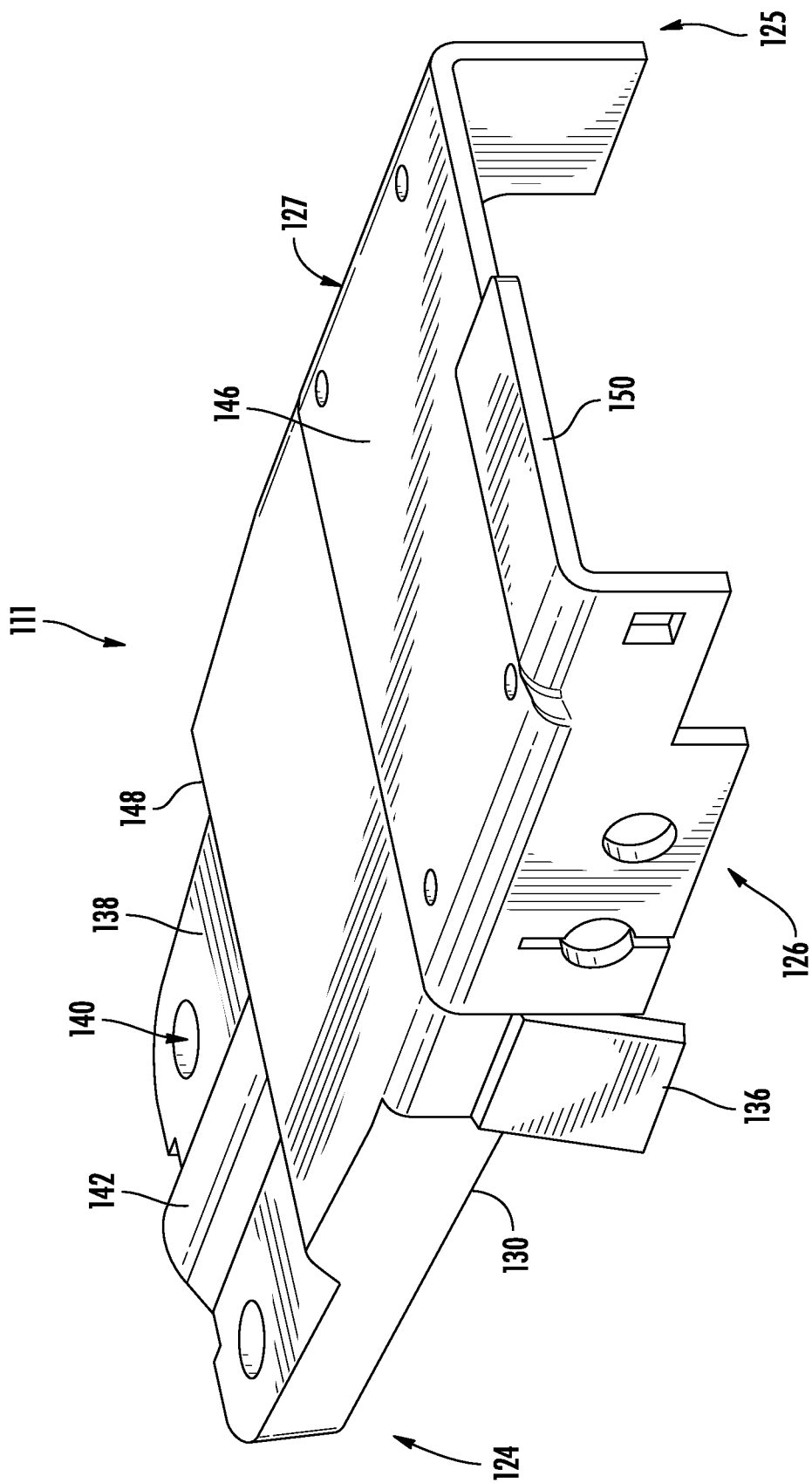
FIG. 2A is a first perspective view of a first section of the assembly of FIG. 1 in accordance with embodiments of the present disclosure.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Modular assemblies/fittings/couplings suitable for use with electrical metallic tubing (EMT) in accordance with the present disclosure will now be described more fully hereinafter with reference to the accompanying drawings, where embodiments are shown. The embodiments may be demonstrated in many different forms and are not be construed as being limited to the embodiments set forth herein. Instead, these embodiments are provided so this disclosure will be thorough and complete, and will fully convey the scope of the system and method to those skilled in the art.

A coupling or connector head for EMT are provided. In some embodiments, an assembly may include rigid tubing (e.g., EMT) connected to a coupling assembly, the coupling assembly including a main body having a first tubular section and a second tubular section. The assembly may further include a connector head connected or coupled to the coupling assembly, the connector head including a first section coupled to a second section, wherein the first and second sections define an internal cavity for housing an electrical connector, and wherein the first tubular section extends within the internal cavity.

Referring now to FIG. 1, an assembly 100 according to embodiments of the present disclosure will be described in greater detail. As shown, the assembly 100 may include a rigid tube or conduit (hereinafter "conduit") 102 connected to a coupling assembly 104, the coupling assembly 104 secured with a connector head 106. Although only one connector head 106 and one coupling assembly 104 are shown, it will be appreciated that a second connector head and second coupling assembly may similarly be present at an opposite end of the conduit 102.

In exemplary embodiments, the conduit 102 is electrical metallic tubing (EMT) or a rigid PVC conduit. EMT is a metal (e.g., steel) raceway of circular cross section, which may be threaded or unthreaded. Although non-limiting, an outer surface 108 of the conduit 102 may be galvanized for corrosion protection. For example, the outer surface 108 may be treated with a combination of zinc, a conversion coating, and a clear organic polymer topcoat to form a triple layer of protection against corrosion and abrasion. In some embodiments, an interior surface (not depicted) of the conduit 102 may include a low-friction coating, which allows wires to be pulled therethrough smoothly and easily, making installation easier and faster. Furthermore, EMT provides electromagnetic interference (EMI) shielding.

The connector head 106 may include a first section 111 coupled to a second section 112. Although not limited to any particular attachment means, the first and second sections 111, 112 may be joined at a second end 114 of the connector head 106 by a set of fasteners 116 (e.g., screws, bolts, rivets, etc.). One or more tabs 118 may further couple the first and second sections 111, 112 together. As shown, the first and second sections 111, 112 may define an internal cavity 120 for housing an electrical connector (not shown). In some embodiments, the electrical connector may include a non-conductive housing having male/female connector parts. Embodiments herein are not limited in this context. The first end 122 of the connector head 106 may be open to permit modular connection with another, similarly configured connector head.

Figure 2B:
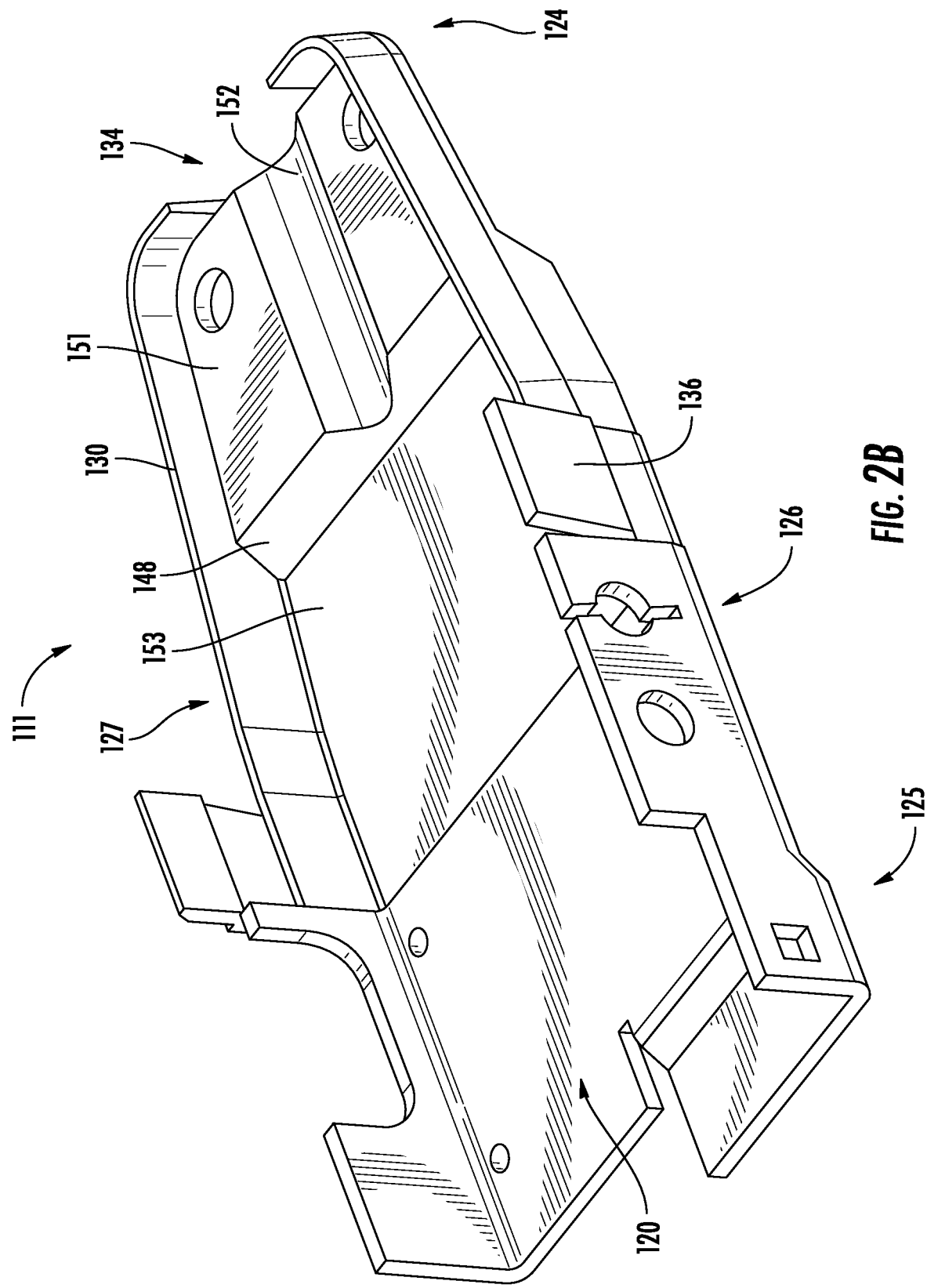
FIG. 2B is a second perspective view of the first section of the assembly of FIG. 1 in accordance with embodiments of the present disclosure.

Turning now to FIGS. 2A-2B, the first section 111 of the connector head 106 according to embodiments of the present disclosure will be described in greater detail. As shown, the first section 111 may include a first end 124 opposite a second end 125, and a first side 126 opposite a second side 127. The first section 111 may include a first perimeter wall 130 extending along the first and second sides 126, 127 and along a portion of the first end 124. The first and second sides 126, 127 may include one or more tabs 136 configured to engage the second section 112 (FIG. 1).

As best shown in FIG. 2A, the first end 124 may include a first end outer surface 138 having one or more openings 140 for the fasteners 116. In some embodiments, the first end 124 may include a ridge or curved portion 142 to accommodate for the tubular shape of the coupling assembly 104. The curved portion 142 may generally extend parallel to the conduit 102.

The first section 111 may further include a second end outer surface 146 connected to the first end outer surface 138 by a sloped section 148. Although non-limiting, the second end outer surface 146 may be substantially parallel to the first end outer surface 138. Extending from the second end outer surface 146 may be an overlap tab 150 configured to engage and extend over a second end outer surface of a corresponding connection head.

As best shown in FIG. 2B, the first end 124 may include an end opening 134 and a first internal planar section 151 facing the internal cavity 120. As shown, the first internal planar section 151 may include an elongated recess 152 configured to receive a portion of the coupling assembly 104 extending through the end opening 134. Although not limited to any particular size and/or shape, the elongated recess 152 is generally sized to surround a first tubular section of the coupling assembly 104, as will be described in greater detail herein. The first internal planar section 151 may be connected to a second internal planar section 153 by the sloped section 148.

Figure 3A:
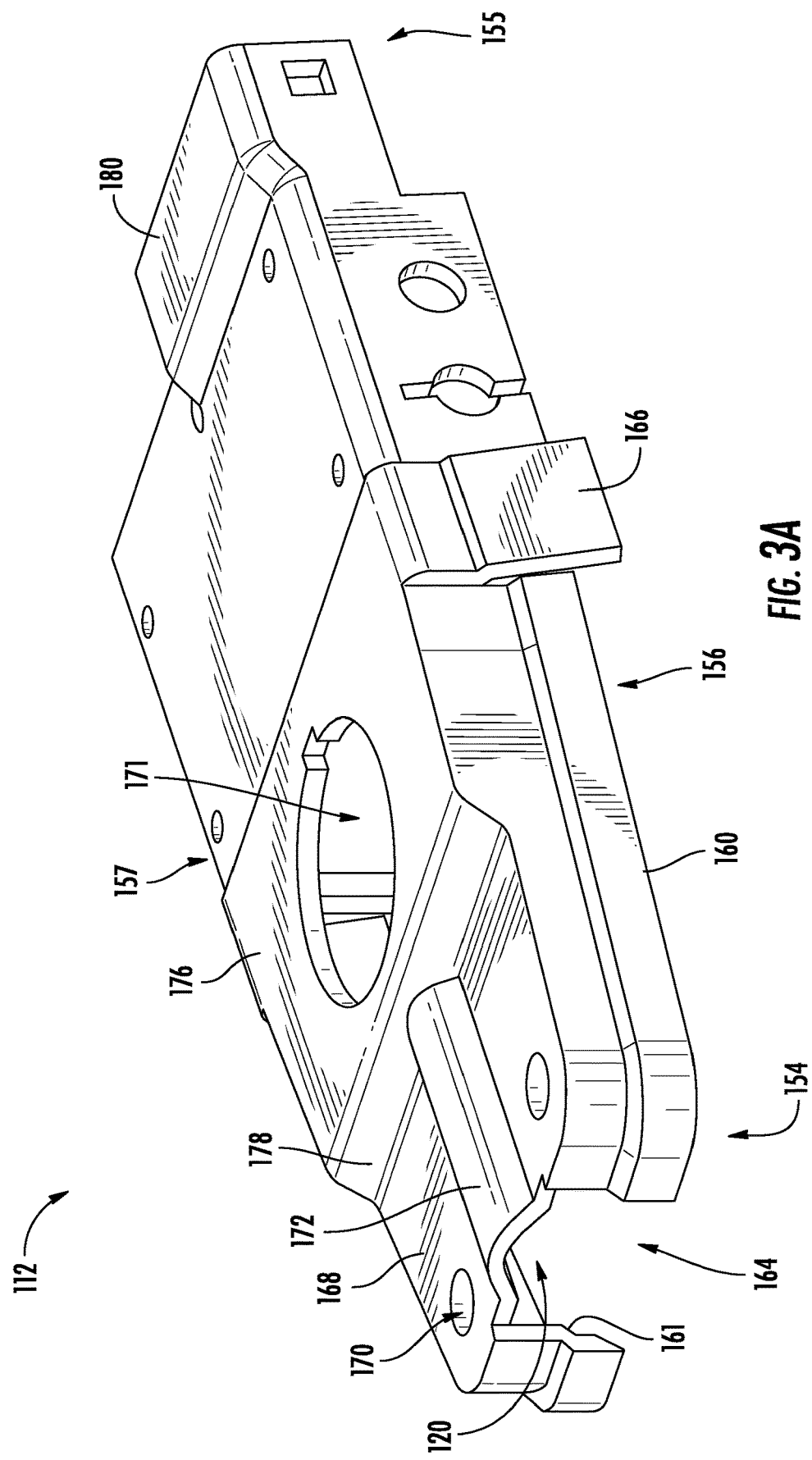
FIG. 3A is a first perspective view of a second section of the assembly of FIG. 1 in accordance with embodiments of the present disclosure.
Figure 3B:
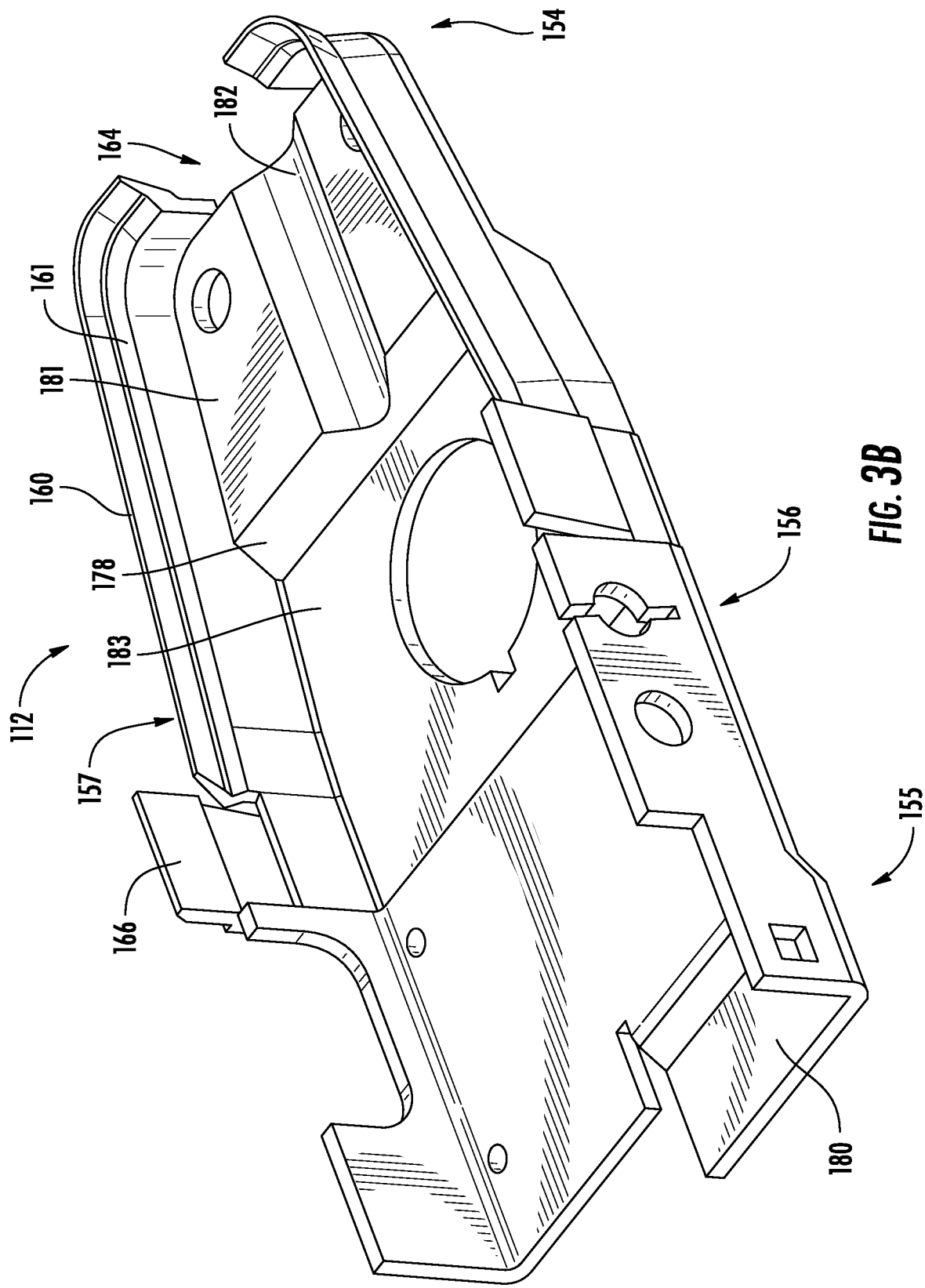
FIG. 3B is a second perspective view of the second section of the assembly of FIG. 1 in accordance with embodiments of the present disclosure.

Turning now to FIGS. 3A-3B, the second section 112 of the connector head 106 according to embodiments of the present disclosure will be described. As shown, the second section 112 may include a first end 154 opposite a second end 155, and a first side 156 opposite a second side 157. The second section 112 may include a second perimeter wall 160 extending along the first and second sides 156, 157 and along a portion of the first end 154. As shown, the second perimeter wall 160 may include a ledge 161 operable to receive and support the first perimeter wall 130 of the first section 111. In some embodiments, the second perimeter wall 160 partially overlaps an exterior of the first perimeter wall 130. The first and second sides 156, 157 may include one or more tabs 166 configured to engage the first section 111.

At the first end 154 may be an end opening 164 to receive a portion of the coupling assembly 104. As best shown in FIG. 3A, the first end 154 may include a first end outer surface 168 having one or more openings 170 for the fasteners 116 (not shown). In some embodiments, the first end 154 may include a ridge or curved portion 172 to accommodate for the tubular shape of the coupling assembly 104. The curved portion 172 may generally extend parallel to the conduit 102.

The second section 112 may further include a second end outer surface 176 connected to the first end outer surface 168 by a sloped section 178. Although non-limiting, the second end outer surface 176 may be substantially parallel to the first end outer surface 168. As shown, the second end outer surface 176 may include a wiring opening 171 configured to receive one or more wires therethrough for connection with the electrical connector (not shown) within the internal cavity 120. Extending from the second end outer surface 176 may be an overlap tab 180 configured to engage and extend over a second end outer surface of a corresponding connection head. In some embodiments, the overlap tab 180 generally extends parallel to the second end outer surface 176.

As best shown in FIG. 3B, the first end 154 may further include a first internal planar section 181 facing the internal cavity 120. As shown, the first internal planar section 181 may include an elongated recess 182 configured to receive a portion of the coupling assembly 104. Although not limited to any particular size and/or shape, the elongated recess 182 is generally sized to surround a first tubular section of the coupling assembly 104, as will be described in greater detail herein. The first internal planar section 181 may be connected to a second internal planar section 183 by the sloped section 178.

Figure 4:
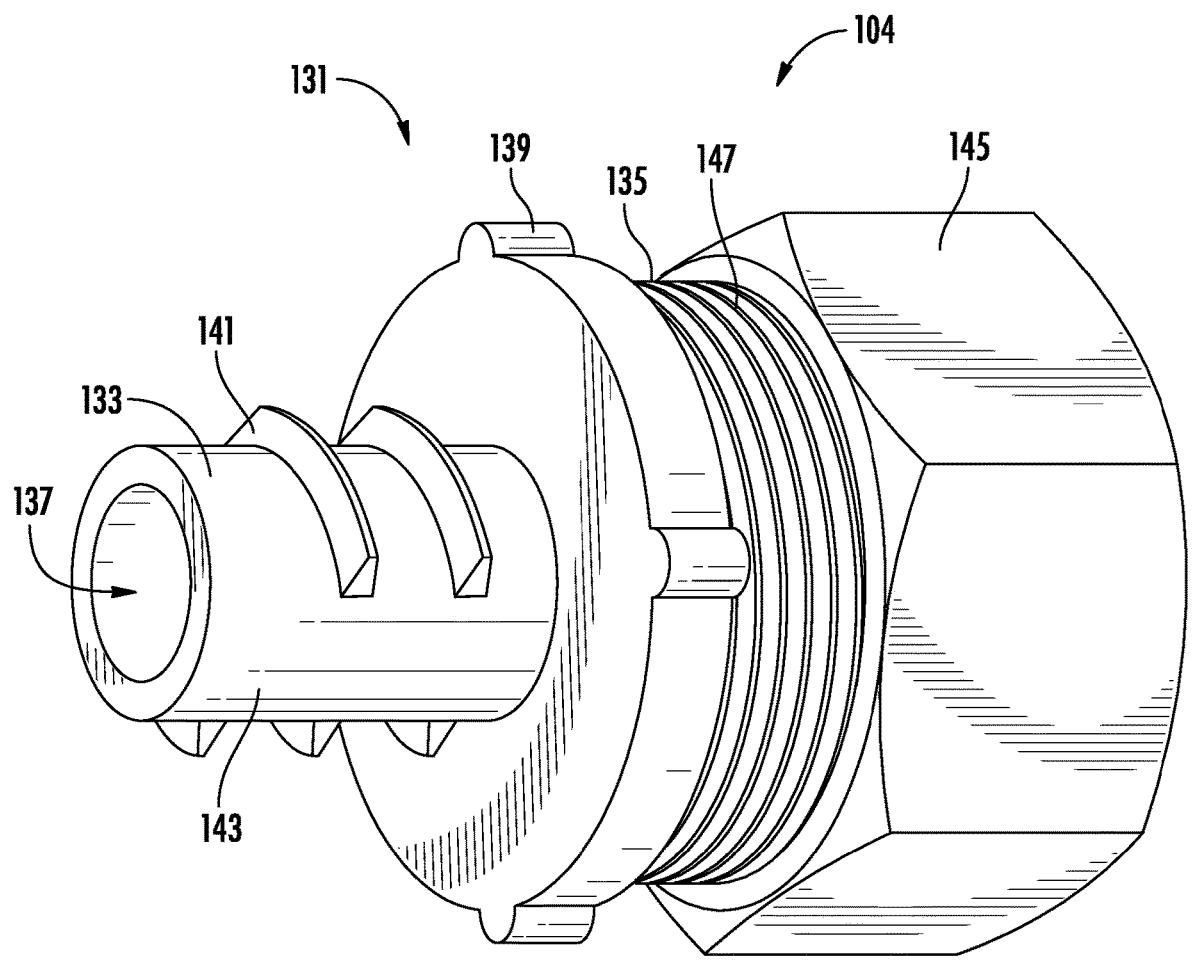
FIG. 4 is a perspective view of a coupling assembly of the assembly of FIG. 1 in accordance with embodiments of the present disclosure.

Turning now to FIG. 4, the coupling assembly 104 according to embodiments of the present disclosure will be described in greater detail. As shown, the coupling assembly 104 may include a main body 131 having a first tubular section 133 connected with a second tubular section 135. A central bore 137 may extend through the first tubular section 133 and the second tubular section 135. A locking nut 139 may extend around the first tubular section 133. In some embodiments, the first tubular section 133 may include one or more locking features 141 (e.g., ridges or teeth) extending from an exterior surface 143 thereof. Although not limited to any specific size or ratio, the first tubular section 133 may have a first diameter and the second tubular section 135 may have a second diameter, which is greater than the first diameter.

As further shown, the coupling assembly 104 may include a nut 145 extending about an exterior surface 147 of the second tubular section 135 of the main body 131. In some embodiments, the exterior surface 147 may be threaded for engagement with a threaded interior surface of the nut 145.

Figure 5:
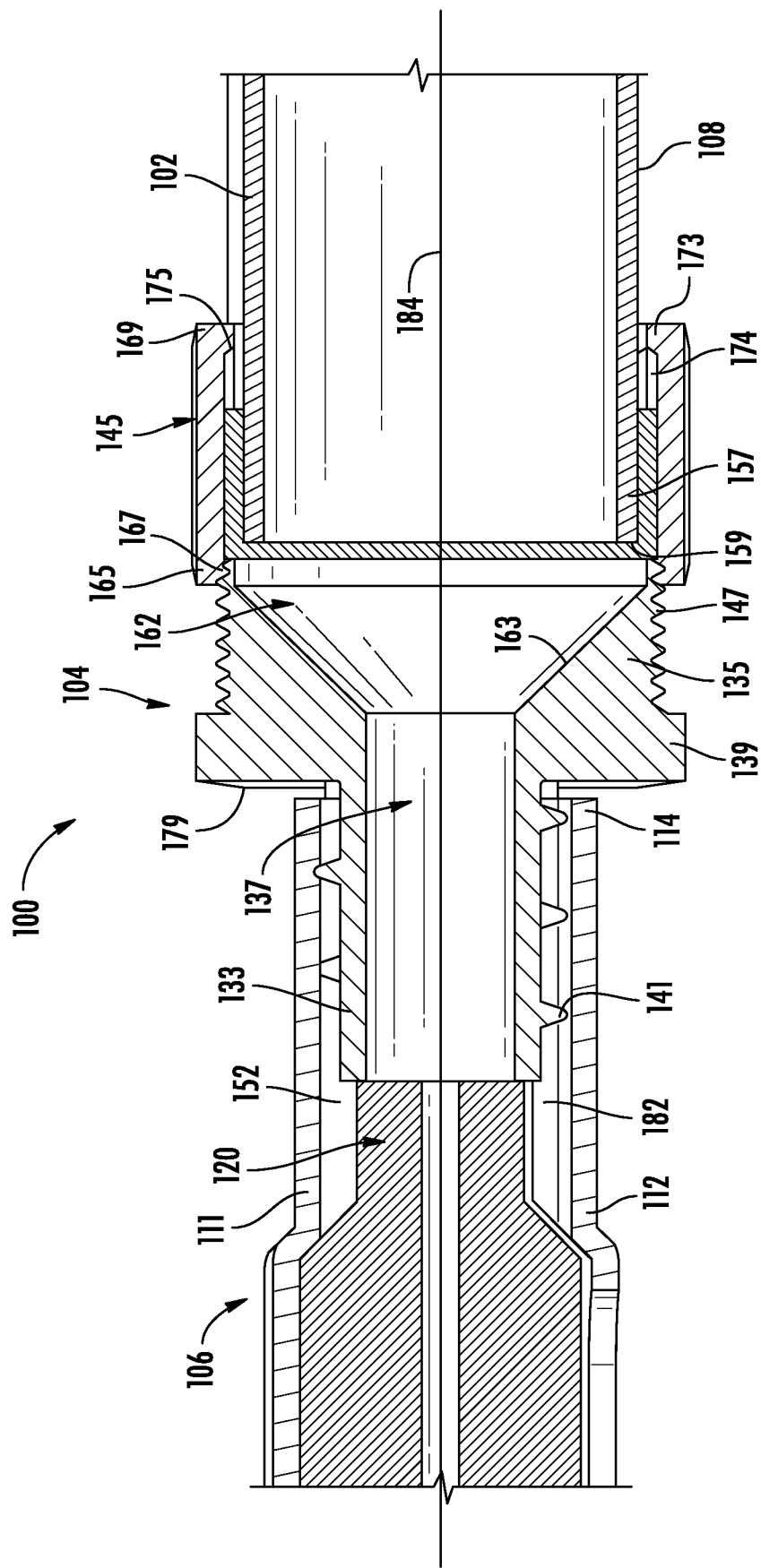
FIG. 5 is a side cross-sectional view of the assembly of FIG. 1 in accordance with embodiments of the present disclosure.

Turning now to FIG. 5, connection between the various components of the assembly 100 according to embodiments of the present disclosure will be described in greater detail. As shown, the conduit 102 is coupled to the connector head 106 by the coupling assembly 104. In this embodiment, a first end 157 of the conduit 102 may extend within the nut 145 until an end face 159 of the conduit 102 is positioned adjacent a first cavity 162 of the central bore 137 of the main body 131. In some embodiments, the first cavity 162 is defined by a sloped inner surface 163, which narrows towards the first tubular section 133. A first axial end 165 of the nut 145 may include a threaded interior surface 167 engaged with the threaded exterior surface 147 of the second tubular section 135. A second axial end 169 of the nut 145 may include a flange 173 extending radially towards the outer surface 108 of the conduit 102. In some embodiments, a compressing ring 174 may be provided about the outer surface 108 of the conduit 102. The compression ring 174 may be in contact with an inner surface 175 of the flange 173.

As further shown, the first tubular section 133 extends within the internal cavity 120 defined by the first and second sections 111, 112 of the connector head 106. In some embodiments, the locking features 141 engage with corresponding recesses or indentations (not shown) provided in the elongated recess 152 of the first section 111 and/or the elongated recess 182 of the second section 112. The locking features 141 and the recesses/indentations may enhance coupling between the connector head 106 and the coupling assembly 104. In some embodiments, the second end 114 of the connector head may abut or be positioned adjacent an outer face 179 of the locking nut 139. In exemplary embodiments, the conduit 102, the coupling assembly 104, and the connector head 106 are aligned with and/or centered about a lengthwise longitudinal axis 184.

Referring now to FIGS. 6A-6B, an assembly 200 according to embodiments of the present disclosure will be described. As shown, the assembly 200 may include a rigid tube or conduit (hereinafter "conduit") 202 connected to a coupling 204, the coupling 204 integrally formed with a connector head 206. Although only one connector head 206 and one coupling 204 are shown, it will be appreciated that a second connector head and second coupling may similarly be present at an opposite end of the conduit 202.

The connector head 206 may include a first section 211 coupled to a second section 212. As shown, the first and second sections 211, 212 may define an internal cavity 220 for housing an electrical connector (not shown). In some embodiments, the electrical connector may include a non-conductive housing having male/female connector parts. Embodiments herein are not limited in this context. A first end 222 of the connector head 206 may be open to permit modular connection with another, similarly configured connector head.

The coupling 204 may include a main body 231 having a first end 232 opposite a second end 233. The main body 231 may define a central bore 237, which is configured to receive the conduit 202. To secure the main body 231 to the conduit 202, a screw or other similar fastener 240 may extend through a fastener shaft 242 for contact with an exterior surface 246 of the conduit 202. As shown, the first end 232 of the main body 231 may be integrally formed with the first section 211 and/or the second section 212 of the connector head 206.

Figure 7:
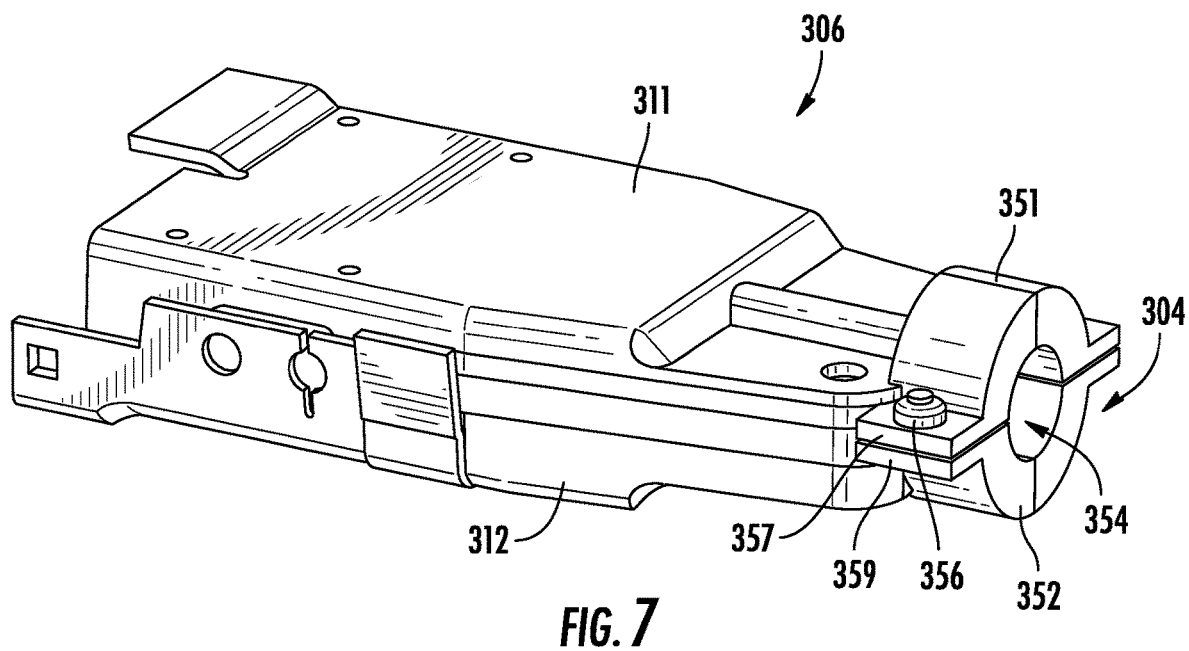
FIG. 7 is a perspective view of a connector head in accordance with embodiments of the present disclosure.

Referring to FIG. 7, a connector head 306 according to another embodiment is shown. The connector head 306 may include a first section 311 coupled to a second section 312. As shown, the first and second sections 311, 312 may define an internal cavity for housing an electrical connector (not shown). A coupling 304 of the connector head 306 may be configured as a clamp having a first half 351 opposite a second half 352. The first and second halves 351, 352 define a central bore 354 for receiving a conduit (not shown) therein. In some embodiments, the first half 351 is integrally formed with the first section 311, and the second half 352 is integrally formed with the second section 312. To tighten the coupling 304 about the conduit, one or more fasteners 356 may extend through flanges 357, 359 of the first half 351 and the second half 352, respectively.

Figure 8A:
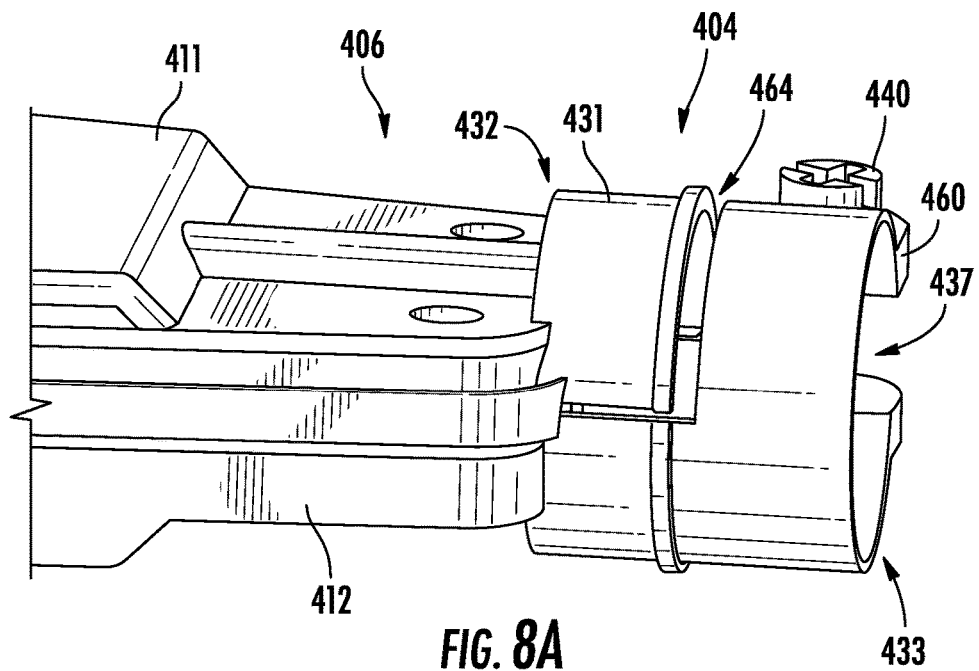
FIG. 8A is a first perspective view of a coupling in accordance with embodiments of the present disclosure.
Figure 8B:
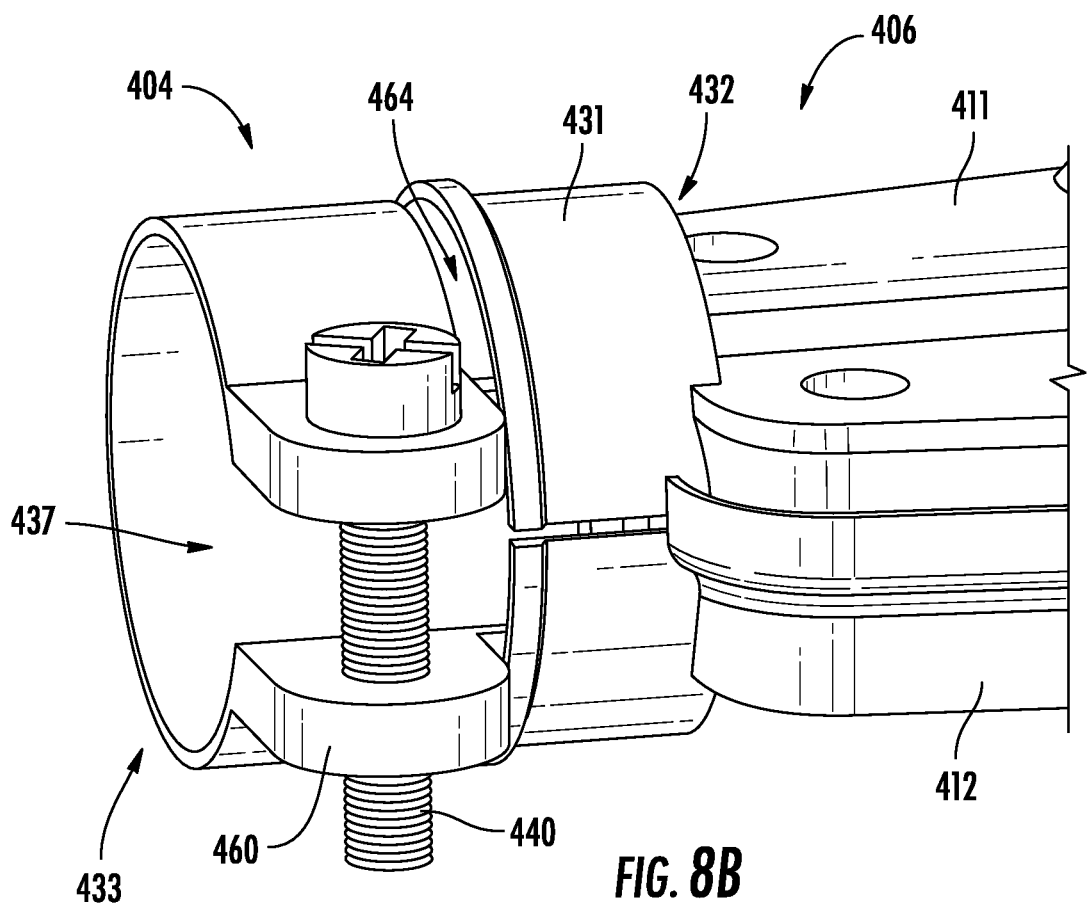
FIG. 8B is a second perspective view of a coupling in accordance with embodiments of the present disclosure.

Referring to FIGS. 8A-8B, a connector head 406 according to another embodiment is shown. The connector head 406 may include a first section 411 coupled to a second section 412. A coupling 404 includes a main body 431 having a first end 432 opposite a second end 433. The main body 431 may define a central bore 437, which is configured to receive a conduit (not shown). To secure the main body 431 about the conduit, a screw or other similar fastener 440 may extend through one or more flanges 460 at the second end 433. As shown, the first end 432 of the main body 231 may be integrally formed with the first section 411 and/or the second section 412 of the connector head 406. In this embodiment, the coupling 404 may include a slot 464 partially about the main body 431 to provide flexibility thereto.

Figure 9:
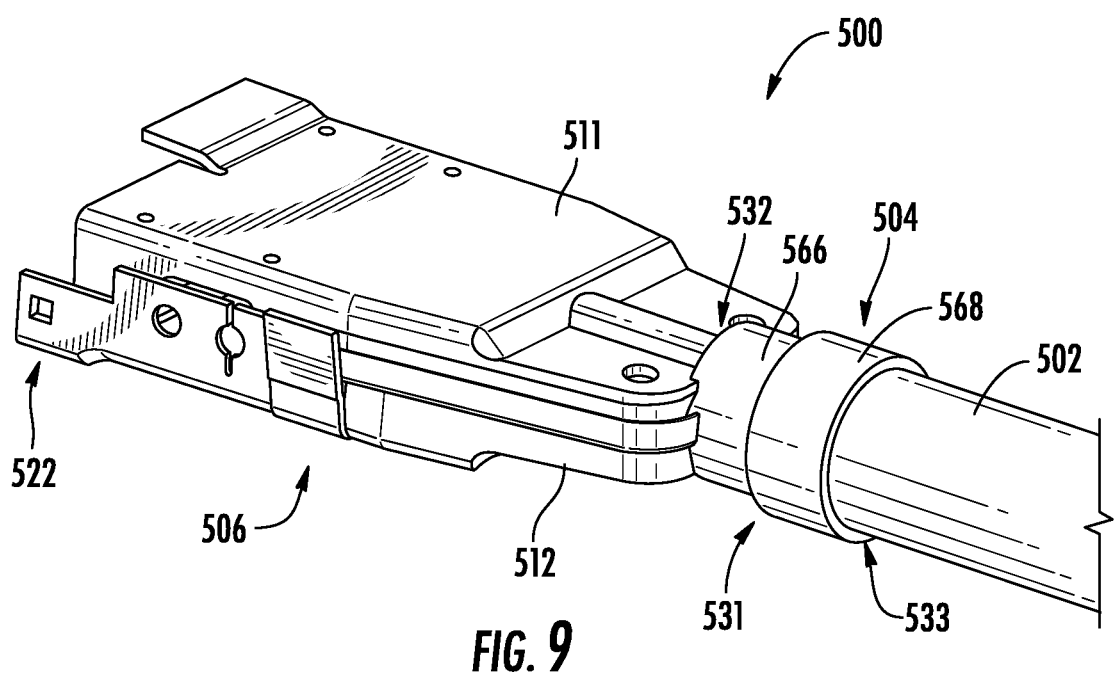
FIG. 9 is a perspective view of an assembly in accordance with embodiments of the present disclosure.

Referring now to FIG. 9, an assembly 500 according to embodiments of the present disclosure will be described. As shown, the assembly 500 may include a conduit 502 connected to a coupling 504, the coupling 504 integrally formed with a connector head 506. The connector head 506 may include a first section 511 coupled to a second section 512. A first end 522 of the connector head 506 may be open to permit modular connection with another, similarly configured connector head.

The coupling 504 may include a main body 531 having a first end 532 opposite a second end 533. The main body 531 may define a central bore, which is configured to receive the conduit 502 therein. As shown, the main body 531 may include a distal section 566 connected to a proximal section 568. As shown, the first end 532 of the main body 531 may be integrally formed with the first section 511 and/or the second section 512 of the connector head 506.

In one embodiment, the distal section 566 and the proximal section 568 are separate components coupled together by, for example, corresponding threading. In another embodiment, the distal section 566 and the proximal section 568 are integrally formed. As shown, a diameter of an exterior surface of the proximal section 568 may be larger than a diameter of an exterior surface of the distal section 566. To secure the main body 531 to the conduit 502, an interior surface of the proximal section 568 and/or the distal section 566 may be threaded. The exterior surface of the conduit 502 may be threaded or smooth in various embodiments.

The foregoing discussion has been presented for purposes of illustration and description and is not intended to limit the disclosure to the form or forms disclosed herein. For example, various features of the disclosure may be grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

The use of "including," "comprising," or "having" and variations thereof herein is meant to encompass the items listed thereafter and equivalents thereof as well as additional items. Accordingly, the terms "including," "comprising," or "having" and variations thereof are open-ended expressions and can be used interchangeably herein.

The phrases "at least one", "one or more", and "and/or", as used herein, are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Furthermore, identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The terms "substantial" or "substantially," as well as the terms "approximate" or "approximately," can be used interchangeably in some embodiments, and can be described using any relative measures acceptable by one of ordinary skill in the art. For example, these terms can serve as a comparison to a reference parameter, to indicate a deviation capable of providing the intended function. Although non-limiting, the deviation from the reference parameter can be, for example, in an amount of less than 1%, less than 3%, less than 5%, less than 10%, less than 15%, less than 20%, and so on.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, the present disclosure has been described herein in the context of a particular implementation in a particular environment for a particular purpose. Those of ordinary skill in the art will recognize the usefulness is not limited thereto and the present disclosure may be beneficially implemented in any number of environments for any number of purposes. Thus, the claims set forth below are to be construed in view of the full breadth and spirit of the present disclosure as described herein.

What is claimed is:

1. An assembly, comprising:
    a rigid tube connected to a coupling assembly, the coupling assembly including a main body having a first tubular section and a second tubular section; and
    a connector head connected to the coupling assembly, the connector head comprising:
        a first section having a first end opposite a second end, wherein the first end is connected to the coupling assembly; and
        a second section detachably coupled to the first section, wherein the first and second sections define an internal cavity for housing an electrical connector, wherein the first tubular section extends within the internal cavity, wherein the second section has a first end opposite a second end, wherein the first end of the second section is connected to the coupling assembly, and wherein the second end of the first section and the second end of the second section each includes an overlap tab extending from a free end.

2. The assembly of claim 1, the coupling assembly comprising a nut extending about an exterior surface of the second tubular section of the main body.

3. The assembly of claim 2, wherein the nut includes a first axial end and a second axial end, wherein an interior surface of the nut at the first axial end is threaded.

4. The assembly of claim 2, wherein the exterior surface of the second tubular section of the main body is threaded.

5. The assembly of claim 1, wherein the first tubular section has a first diameter, wherein the second tubular section has a second diameter, and wherein the second diameter is greater than the first diameter.

6. The assembly of claim 1, wherein the connector head has a closed end opposite an open end, wherein the closed end surrounds the first tubular section.

7. The assembly of claim 6, wherein the closed end includes an end wall in abutment with a locking nut of the main body, wherein the end wall includes an opening receiving the first tubular section.

8. The assembly of claim 6, wherein the closed end includes a first internal planar section opposite a second internal planar section, wherein at least one of the first internal planar section and the second internal planar section includes a recess for receiving the first tubular section.

9. The assembly of claim 1, wherein the rigid tube is electrical metallic tubing.

10. An electrical metallic tubing coupling assembly, comprising:
  an electrical metallic tubing connected to a coupling assembly, the coupling assembly including a main body having a first tubular section connected to a second tubular section; and
  a connector head coupled to the coupling assembly, the connector head comprising:
    a first section having a first end opposite a second end, wherein the first end is connected to the coupling assembly; and
    a second section detachably coupled to the first section, wherein the first and second sections define an internal cavity for housing an electrical connector, wherein the first tubular section extends within the internal cavity, wherein the second section has a first end opposite a second end, wherein the first end of the second section is connected to the coupling assembly, and wherein the second end of the first section and the second end of the second section each includes an overlap tab extending from a free end.

11. The electrical metallic tubing assembly of claim 10, the coupling assembly comprising a nut threadably coupled to an exterior surface of the second tubular section, wherein the nut extends about the electrical metallic tubing.

12. The electrical metallic tubing assembly of claim 11, wherein the nut includes a first axial end and a second axial end, wherein an interior surface of the nut at the first axial end is threaded.

13. The electrical metallic tubing assembly of claim 11, wherein the exterior surface of the second tubular section of the main body is threaded.

14. The electrical metallic tubing assembly of claim 10, wherein the first tubular section has a first diameter, wherein the second tubular section has a second diameter, and wherein the second diameter is greater than the first diameter.

15. The electrical metallic tubing assembly of claim 10, wherein the connector head has a closed end opposite an open end, wherein the closed end surrounds the first tubular section.

16. The electrical metallic tubing assembly of claim 15, wherein the closed end includes an end wall in abutment with a locking nut of the main body, wherein the end wall includes an opening, and wherein the first tubular section extends through the opening.

17. The electrical metallic tubing assembly of claim 15, wherein the closed end includes a first internal planar section opposite a second internal planar section, wherein at least one of the first internal planar section and the second internal planar section includes a recess for receiving the first tubular section.

18. A connector head for an electrical metallic tubing, the connector head comprising:
  a first section; and
  a second section detachably coupled to the first section by one or more fasteners, wherein the first and second sections define an internal cavity for housing an electrical connector, wherein the first section includes a first internal planar section, wherein the second section includes a second internal planar section extending parallel to the first internal planar section, and wherein at least one of the first internal planar section and the second internal planar section includes a recess for receiving a coupling assembly connected to the electrical metallic tubing.

19. The connector head of claim 18, wherein the first and second sections define a closed end opposite an open end, and wherein an opening is provided through the closed end.

20. The connector head of claim 18, wherein the second section includes a third planar section, the third planar section including a wiring opening.

* * * * *